Patented Sept. 18, 1951

2,567,917

UNITED STATES PATENT OFFICE 2,567,917

METHOD OF MAKING BETA-PINENE, REARRANGED ALPHA-PINENE, AND VINYL CYCLOHEXENE RESIN

Samuel G. Burroughs, Pittsburgh, Pa., assignor to Pennsylvania Industrial Chemical Corporation, Clairton, Pa., a corporation of Pennsylvania No Drawing. Application August 23, 1948, Serial No. 45,782

7 Claims. (Cl. 260—80.5)

1

This invention relates to a resin composed of mixed vinyl cyclohexene and terpene polymers and/or copolymers.

More specifically the invention relates to a resin composed of mixed polymers and/or copolymers of vinyl cyclohexene with a terpene blend composed of beta-pinene and an alpha-pinene containing terpenes which have been rearranged by an isomerization treatment.

1-vinyl cyclohexene-3 is produced as a derivative of cyclohexene formed as a by-product in certain catalytic processes, such as processes of making butadiene. As produced it is associated with cyclohexanol and related alcohols in a combined proportion of about 10% to 15% of those substances. This impure, approximately 85% vinyl cyclohexene polymerizes under the influence of aluminum chloride and related acid-reacting metal halide catalysts very slowly and incompletely to form two types of resin, one of which has a melting point of about 100 and is soluble in mineral spirits at normal room temperature, and the other of which is infusible and is insoluble in all commonly used organic solvents. These two types of resin are formed approximately simultaneously and separate from each other with precipitation of the insoluble type. Because of poor yield and the impossibility of directing the polymerization reaction, the impure cyclohexene is to be considered valueless as a starting material for the production of resin of either type. I have, however, found that by purifying the vinyl cyclohexene and by subjecting it to polymerization in association with a suitable terpene or terpenes, I am able to obtain good yields of solid resins.

Any suitable purification procedure may be followed to obtain an approximately pure vinyl cyclohexene starting material. One specific procedure which I have advantageously followed is to wash the impure vinyl cyclohexene by-product with 59° Baumé sulphuric acid (74%) at 5° C. The product of the purification consists at least about 95% of pure vinyl cyclohexene responding apparently to the formula

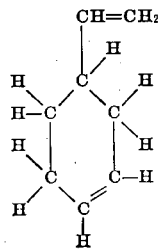

2

This acid washed vinyl cyclohexene has a specific gravity of 0.8336 at 15.5° C., a boiling range of 125° C. to 131° C., a bromine number of 280, and a refractive index of 1.464 at 20° C. This material when diluted with a hydrocarbon diluent, such as toluol, and subjected to a polymerization reaction with aluminum chloride, or its substantial equivalent as a catalyst, gives a yield of about 80% of infusible insoluble resin, and about a 20% yield of resin having a melting point of 80° C. (ball and ring) which is soluble in mineral spirits at normal room temperature. There is great diversity in the properties of the diverse types of resin so produced inasmuch as the insoluble type is not soluble to any appreciable extent in toluol, acetone, alcohol, ethyl-acetate, carbon tetrachloride, or mineral spirits, with heating. It also is not soluble in molten coumarone-indene resin, or molten terpene resin. The insoluble type of vinyl cyclohexene resin does not melt up to its decomposition point. A less carefully acid washed vinyl cyclohexene, which I also have used, is between 85% and 95% pure.

Whereas the two diverse resins of the insoluble and soluble types have each its individual utility, I have discovered that a more useful product is obtained by polymerizing a mixture of the vinyl cyclohexene, which as shown in the formula is a mixed cyclic and open chain material, with a suitable terpene or terpenes to produce a soluble, thermoplastic resin. Apparently such resin is in part at least the result of copolymerization, inasmuch as up to a certain percentage of the vinyl cyclohexene only soluble polymers are formed.

Beta-pinene is a turpentine constituent giving a peculiarly high response to polymerization promoting stimuli, and particularly to polymerization with the acid-reacting metallic halides. It is present in substantial proportion in gum spirits of turpentine derived by tapping live conifers and by distillation of the liquids thus obtained, being present in that turpentine in a proportion of about 30% thereof. It also is present in a proportion of about 25% of the whole in sulphate turpentine which is a liquid extracted from the waste produced in the process of making sulphate pulp from the wood of conifers. As commercially available from either of these sources the beta-pinene which is sold as such is about 85% to 95% pure, varying with the methods used in its separation from the associated mono-cyclic and by-cyclic terpenes. It boils close to 165° C. and has an aniline point by the standard methods of aniline point determination of about 34° C.

As polymerized by itself by bringing it into reactive contact with aluminum chloride or an equivalent acid-reacting halide, the commercial beta-pinene, about 85% pure, gives an approximately 85% yield of terpene resin having a softening point (ball and ring) of from about 115° C. to 120° C. When brought to a state of approximate purity, the beta-pinene gives an approximately 100% yield of terpene resin having a softening point (ball and ring) of about 130° C. to 135° C. By mixing beta-pinene, in either an impure commercial exemplification of that material or a plant prepared beta-pinene over 95% pure, with vinyl cyclohexene, a yield of higher softening point soluble resin than is obtainable from beta-pinene by itself is obtained in a yield at least equal to that obtained without inclusion of the vinyl cyclohexene.

Alpha-pinene is a turpentine constituent giving by itself relatively poor response to polymerization promoting stimuli, even when subjected to polymerization with the most active of the acid-reacting metallic halides. It is present in substantial proportion in gum spirits of turpentine derived by tapping live conifers and by distillation of the liquids thus obtained, being present in that turpentine in a proportion of about 70% thereof. It also is present in a proportion of about 60% of the whole in sulphate turpentine which is a liquid extracted from the waste produced in the process of making sulphate pulp from the wood of conifers. It is present in a proportion of about 40% in wood spirits of turpentine which is extracted from chips cut from the stumps of conifers. It is therefore the terpene which is quantitatively the most available. As commercially available from either of these sources the alpha-pinene which is sold as such is over 90% pure, varying with the methods used in its separation from the associated mono-cyclic and by-cyclic terpenes. It distills within the range of 150° C. to 160° C. (vapor temperature) and has an aniline point by the standard method of aniline point determination of about 46° C.

As polymerized by itself by bringing it into reactive contact with aluminum chloride or an equivalent acid-reacting halide, the commercial alpha-pinene, about 90% pure, gives an approximately 40% yield of terpene resin having a softening point (ball and ring) of about 50° C. to 70° C. When brought to a state of approximate purity, the alpha-pinene gives a slightly lower yield of terpene resin having a slightly lower softening point. By mixing alpha-pinene, in either an impure commercial exemplification of that material or a prepared alpha-pinene over 95% pure, with vinyl cyclohexene, a yield of higher softening point resin than is obtainable from alpha-pinene by itself is obtained in a yield much greater than that obtained without inclusion of the vinyl cyclohexene.

In a certain application of Frank W. Corkery and myself, Serial No. 37,305, filed July 6, 1948, which has matured into Patent No. 2,483,124, granted September 27, 1949, there is disclosed a preparatory isomerization treatment of alpha-pinene and the polymerization of the "rearranged alpha-pinene" prepared by that treatment. The "rearranged alpha-pinene," which consists preponderantly of a mixture of camphene and dl-limonene monomers is a good starting material for resin-forming polymerization. It approaches, though it does not equal, the capacity of beta-pinene to polymerize under appropriate stimuli to hard terpene resin polymers. I shall define that terpene liquid briefly in terms of its production and composition.

The "rearranged alpha-pinene" is obtained by treating alpha-pinene with fuller's earth having a pH value of 5.5 to 6.6 inclusive and which has been heat treated for from 5 to 30 minutes at a temperature of from 225° C. to 300° C. under such conditions that the rate of lowering in aniline point of the alpha-pinene undergoing treatment does not exceed an aniline point drop of 1.2° C. per hour. The final product has an aniline point between 35° C. and 38.5° C. by the A. S. T. M. D 611-46 T method of aniline point determination, the aniline point having been lowered from about 45.8° C. by the treatment. The product consists over 70% of a mixture of camphene and dl-limonene, the remainder being chiefly terpinene, terpinolene and heavier oils. An ideal procedure may give almost 60% camphene and 30% dl-limonene, which are apparently subject to copolymerization under the polymerization-promoting stimulus of aluminum chloride and aluminum bromide. A good result of the treatment is a combined content about 80% camphene and dl-limonene. By "rearranged alpha-pinene" as used herein I mean the product of moderate isomerization of alpha-pinene which responds to the above definition and limitation both in composition and in the method of treatment by which it is obtained.

Having polymerized a number of terpenes, and mixtures of them, with vinyl cyclohexene with highly desirable results, I believed it probable that the terpene mixture which I call "rearranged alpha-pinene" also would give excellent results when subjected to polymerization with vinyl cyclohexene in a mixed starting liquid. That is not the case. When a mixture of the "rearranged alpha-pinene" and vinyl cyclohexene is subjected to polymerization in the same proportions and under the same conditions as obtain in the polymerization of vinyl cyclohexene and alpha-pinene mixtures, as in my companion application Serial No. 45,784, the result is disappointing. The mixture of "rearranged alpha-pinene" with vinyl cyclohexene gives lower yields of hard terpene resin polymers of lower softening point than are obtained by polymerization of alpha-pinene itself in admixture with the vinyl cyclohexene. Also the mixture of "rearranged alpha-pinene" and vinyl cyclohexene gives lower yields of hard terpene resin polymers of lower softening point than are obtained by polymerizing the "rearranged alpha-pinene" alone.

I cannot explain the above fact. Also I cannot explain the fact which I have discovered that if the "rearranged alpha-pinene" be blended with beta-pinene and this mixture in turn blended with vinyl cyclohexene, the result of a polymerization gives hard terpene resin polymers in better yield and of higher softening point than was to be anticipated. That is, the results both as to yield and softening point are better than the average obtained by polymerizing given quantities of beta-pinene and vinyl cyclohexene and given quantities of "rearranged alpha-pinene" and vinyl cyclohexene, and taking an average of proportional results.

Currently I also am unable to account for the fact that the blending of beta-pinene with "rearranged alpha-pinene" gives far better than averaged results, considering the disappointing results obtained by merely mixing the "rearranged alpha-pinene" with the vinyl cyclohexene. Even a theoretical explanation would require patient study and an empirical explanation would required extended exploration of the mechanism of copolymerization which apparently is involved.

My experience leads me to assume that, taken by itself, beta-pinene is the ideal terpene starting material for resin-forming polymerization. As blended with vinyl cyclohexene both the softening point and color stability of beta-pinene resin is improved. From my viewpoint, however, the advantage obtained by blending beta-pinene or by substituting other terpenes such as "rearranged alpha-pinene" therefor, is to conserve the supply of beta-pinene or to broaden the base of starting materials for the production of good, high-melting terpene resins. I have found that in blending beta-pinene with "rearranged alpha-pinene" for subsequent blending with vinyl cyclohexene and polymerization a content of beta-pinene equal to 40% the weight of terpene blend is the least content of beta-pinene which leads to good results. The upper limit of beta-pinene in the blend must be arbitrary because it involves the balancing of even better results by inclusion of an increased content of beta-pinene and the desirability of conserving the beta-pinene. Arbitrarily, I take a 75% content of beta-pinene as maximum. In the more general discussion hereof, and particularly with respect to proportioning with vinyl cyclohexene, the above blend will be referred to simply as the "terpene blend."

As a general procedure the vinyl cyclohexene which has been subjected to a purification treatment is mixed with the terpene blend and with an organic diluent which is substantially inert to polymerization with the vinyl cyclohexene and the terpenes, and is brought into reactive contact with an acid-reacting metal halide polymerization catalyst, such as anhydrous aluminum chloride and aluminum bromide. During the progress of the polymerization reaction, the reaction temperature is maintained within a range which desirably is suitable for relatively rapid polymerization without reaction surge, such as a temperature within the approximate range of 0° C. to 80° C., a temperature within the range of about 35° C. to 60° C. being considered optimum from the viewpoints of reaction speed and ease of temperature control. Upon the completion of catalyst addition, which desirably is effected without such rapidity as to cause a surge, agitation of the reaction mixture is continued for a substantial period of time completely to polymerize the vinyl cyclohexene which appears to lag in the combined polymerization reaction.

To remove the catalyst at the end of the polymerization treatment two standard recovery methods may be employed. In accordance with one such procedure the mixture is drowned with a 5% water solution of hydrochloric or sulphuric acid, and is then water washed and neutralized with a 10% water solution of sodium carbonate. The washed solution is then warmed to 60° C. and is allowed to settle until a clear resin solution is obtained. Such resin solution is distilled, desirably at a still temperature of about 210° C., and is then steam distilled at still temperatures within the range of about 210° C. to 260° C. until a resin of the desired softening point remains as a residue.

The other method of removing catalyst and recovering solid resin tends to give a somewhat lighter color than the method described above. In accordance with this latter procedure the polymerization mixture is allowed to settle until the metal halide sludge separates out, which separation is complete within about one hour to twenty-four hours. The solution is decanted off, the sludge is washed with a suitable organic solvent, such as refined solvent naphtha, and the washings are added to the resin solution. The combined resin solution thus obtained is clear, but is deep red in color due to the retention of a soluble complex of the metal halide. This clear but highly colored solution is purified by refluxing it at a still temperature of about 140° C. to 150° C. with fuller's earth having but slight acidity, which is not of necessity dry, and slacked lime for a period of three hours. During this treatment hydrochloric acid is driven off and the original soluble aluminum chloride complex comes down as a precipitate. An appropriate quantity of clay for use in the reflux purification is about 7.5% of the total weight of vinyl cyclohexene and the terpene blend and a quantity of lime equal to the weight of the clay desirably is used. As low as 5% clay and lime may be used and as much may be used as will not interfere with the refluxing. Up to as much as 15% to 20% each of clay and lime is usable. After refluxing, the resin solution is filtered and a clear light yellow resin solution is obtained, one of the common commercial filter aids desirably being used during the filtering. This resin solution is then steam distilled, desirably at still temperatures of about 210° C. to 260° C., until solid resin of the desired melting point remains as a residue.

The above recovery procedure results in the production of a resin of particularly light color, but does so at the sacrifice of a small proportion of the resin yield which is retained in the sludge initially separated from the resin solution. This proportion of the resin carried down with the sludge may largely be recovered by drowning the sludge with a 5% water solution of hydrochloric acid or sulphuric acid, then agitating the resin with an organic solvent, such as distilled solvent naphtha, and distilling off the solvent. This leads to recovery of entrapped resin which is of darker color than that obtained by steam distillation of the resin solution.

It has been noted that the mixture of vinyl cyclohexene and the terpene blend is diluted with an organic solvent diluent inert to polymerization under conditions of the process. That diluent preferably is one of the low aniline point organic solvents which is inert in the process, as for example one of the aromatic hydrocarbon solvents which have no unsaturation outside the benzene ring, such as benzol, toluol, xylol, refined solvent naphtha and ethyl benzene, or one of the chlorinated aromatic solvents, such as chloro-benzol. Regardless of the specific solvent which is used, most desirably it is included in a quantity not substantially less than 30% the total reaction liquid in order to maintain activity as polymer formation proceeds. It can be included in any greater quantity subject to the practical consideration that increased volume of diluent tends to slow the reaction and to increase the reaction time, and also to require that an increased quantity of catalyst be used in order to make reactive contact with the polymerizable vinyl cyclohexene and the terpene blend. Also it is uneconomical to use and distill off more diluent than performs a useful purpose during the polymerization reaction. As a practical consideration I prefer to include the diluent in no more than about 80% of the total volume of the reaction mixture.

I have found that in using anhydrous aluminum chloride or aluminum bromide as the polymerization catalyst as little as 2% by weight of such catalyst with respect to the combined weight of the vinyl cyclohexene and the terpene blend is sufficient to effect complete polymerization, and even less than 2% may usefully be employed. Preferably I utilize anhydrous aluminum chloride or aluminum bromide in a quantity equal to about 3% to 15% the weight of the combined vinyl cyclohexene and the terpene blend in accordance with the other conditions of the process. Quantities of those catalysts over 25% effect no appreciable shortening in the time required for the polymerization reaction even when conduct of the polymerization at low temperature indicates the use of a relatively large proportion of catalyst, unless a particularly great volume of diluent also be used.

It has been noted above that in subjecting a mixture of vinyl cyclohexene and the terpene blend to polymerization the vinyl cyclohexene functions in the mixture to raise the melting point of the resin which may be recovered. It is to be noted that this function is performed down to the least proportion of vinyl cyclohexene which gives a perceptible increase. That minimum proportion is, as will be exemplified herein, below 15% of vinyl cyclohexene in the mixture of that material with the terpene blend, if in fact there is any proportion which may be considered as an absolute minimum exerting no measurable effect on the product resin. For purposes of practical definition of the point at which the effect of including vinyl cyclohexene becomes negligible, I give 10% as a minimum. In seeking to obtain resin of particularly high melting point the proportion of vinyl cyclohexene to the terpene blend can be increased for the production of high melting thermoplastic resin up to a point at which the proportion of insoluble polymers renders further increase in the proportion of the vinyl cyclohexene uneconomical. I have found that the best average results both as to the melting point of the thermoplastic resin which is produced and the yield of such thermoplastic resin are obtained when the vinyl cyclohexene constitutes about 25% to 45% of the polymerizable mixture, there being a substantial production of insoluble resin when equality in the weights of the two diverse ingredients is approached with rapid increase above that point.

My starting material for polymerization thus comprises a mixture of the terpene blend and vinyl cyclohexene in which the vinyl cyclohexene is included in a proportion of from 5% to 50% of the total blend and most desirably in a proportion of from 25% to 45% of the blend in order to obtain maximum inclusion of vinyl cyclohexene in the resin polymers without forming insoluble polymers, the proportions being by weight.

The following will exemplify the method of my invention.

*Example 1*

In this example the vinyl cyclohexene forming an element of the blended starting material was about 95% pure figured on the basis of total unsaturation in accordance with a bromine number of 280. It had been pretreated with 59° Baumé sulphuric acid neutralized and washed with water.

The beta-pinene was approximately 85% pure and distilled over 90% within the range of 160° C. to 166° C. (vapor temperature). The beta-pinene when subjected to polymerization by itself under the influence of anhydrous aluminum chloride gave an 85% yield of 120° C. (ball and ring) softening point terpene resin.

The "rearranged alpha-pinene" was the product of a carefully conducted isomerization treatment of the alpha-pinene as described above. It consisted over 70% of a mixture of camphene and dl-limonene. When mixed with vinyl cyclohexene in the proportion of vinyl cyclohexene equal to 40% of the blend and the blend subjected to polymerization with anhydrous aluminum chloride, the resultant resin was obtained in a yield of 69% and had a softening point of 86° C. (ball and ring).

The reaction liquid was made up by blending 50 cc. (42 gm.) of beta-pinene, 150 cc. (127 gm.) of "rearranged alpha-pinene" and 50 cc. (41 gm.) of vinyl cyclohexene. This mixture of vinyl cyclohexene and terpenes was mixed with 300 cc. of toluol.

To this diluted reaction liquid 15 gm. of aluminum chloride was added during a period of 1 hour and was agitated into reactive contact with the vinyl cyclohexene and terpenes of the reaction liquid. After the addition of aluminum chloride had been completed, agitation was continued for a further period of 2 hours to complete polymerization. During the entire polymerization period the temperature was held within the range of 40° C. to 45° C. No insoluble resin was formed.

At the end of the polymerization treatment the reaction mixture was warmed to 60° C., was allowed to settle and a clear solution was decanted away from the sludge. That sludge was drowned with a 5% water solution of hydrochloric acid and was agitated with distilled solvent naphtha. The solution from the sludge was added to the original solution. This entire resin solution was refluxed with clay and lime and was filtered. The filtered solution was distilled at 210° C. (still temperature) and was steam distilled at a still temperature of from 210° C. to 260° C. until a residue of solid resin was obtained.

The resin recovered by distillation was 181 gm. (86.2%) of thermoplastic soluble resin having a softening point of 101° C. and a color 3 on the Gardner color scale. When dissolved in an equal weight of mineral spirits the resin showed no cloud down to a temperature of 0° C.

In the above example it will be seen that the content of beta-pinene which was about 25% the total terpene blend was too small favorably to affect the polymerization of the "rearranged alpha-pinene." The result was merely additive, with the "rearranged alpha-pinene" polymerizing to about the same yield and softening point of resin as was theoretically to be expected.

*Example 2*

In this example vinyl cyclohexene, beta-pinene and "rearranged alpha-pinene" of the same grades as in Example 1 were used. In making up the starting liquid these three polymerizable ingredients were mixed in the proportional quantities of 100 cc. (84 gm.) of beta-pinene, 100 cc. (82 gm.) of "rearranged alpha-pinene," 50 cc. (41 gm.) of vinyl cyclohexene. These polymerizable constituents were mixed with 300 cc. of toluol to form the reaction mixture. Aluminum chloride in the amount of 15 gm. was added as in Example 1 and the other conditions of the polymerization and recovery procedures were identical with those of Example 1. No insoluble resin was formed.

The resin recovered by distillation was a thermoplastic soluble resin in a yield of 193 gm. (92%), had a softening point of 114° C. (ball and ring) and was color 3 on the Gardner color scale. When dissolved in an equal weight of mineral spirits the resin showed no cloud down to a temperature of 0° C.

The yield and softening point of the hard terpene resin polymers which were obtained show that under the influence of an increased proportion of beta-pinene the "rearranged alpha-pinene" entered into the polymerization in a manner not to be anticipated from the action of that terpene material unblended with beta-pinene. It, therefore, can be considered that in the polymerization the "rearranged alpha-pinene" in large measure took the place of an equal quantity of beta-pinene as blended with the vinyl cyclohexene to form a starting material for the resin-forming polymerization.

In order to check the maximum proportion of vinyl cyclohexene which desirably may be included in the starting mixture, a terpene blend in the same quantities and proportions as in Example 2 was made up and was mixed with 200 cc. (164 gm.) of vinyl cyclohexene and 350 cc. of toluol. Aluminum chloride in the amount of 18 gm. was used and the conditions of the process were otherwise as in Example 2. There was a formation of 18 gm. of insoluble resin and that having been observed, procedure for the recovery of thermoplastic soluble resin was not conducted. The formation of an appreciable quantity of insoluble resin indicated that a 50% inclusion of vinyl cyclohexene is approximately the maximum desirable content of that material in the starting mixture.

*Example 3*

In this example vinyl cyclohexene and a terpene blend consisting of beta-pinene and the "rearranged alpha-pinene" were mixed. The starting mixture consisted of 100 cc. (84 gm.) of beta-pinene, 100 cc. (82 gm.) of "rearranged alpha-pinene" and 150 cc. (123 gm.) of vinyl cyclohexene, all of which were mixed with 350 cc. of toluol. The polymerization procedure and recovery procedure were identical with those of Example 1, save that in polymerization 18 gm. of aluminum chloride was used. No insoluble resin was formed.

The resin recovered by distillation was a thermoplastic soluble resin in a yield of 264 gm. (90%) having a softening point of 128° C. (ball and ring) and a color 3 on the Gardner color scale. When dissolved in an equal weight of mineral spirits the resin showed no cloud down to a temperature of 0° C.

*Example 4*

A reaction mixture was made up comprising vinyl cyclohexene, beta-pinene and "rearranged alpha-pinene" of the same grades as in the preceding examples. The starting material comprised 140 cc. (117 gm.) of beta-pinene, 100 cc. (82 gm.) of "rearranged alpha-pinene" and 160 cc. (127 gm.) of vinyl cyclohexene, which were mixed with 400 cc. of toluol.

The polymerization and recovery procedures were identical with those of Example 1, save that in the polymerization 20 gm. of aluminum chloride was used. No insoluble resin was formed.

The resin recovered by distillation was a thermoplastic soluble resin in a yield of 302 gm. (93%) which had a softening point of 134° C. (ball and ring) and a color 4 on the Gardner scale. When dissolved in an equal weight of mineral spirits the resin showed no cloud down to a temperature of 0° C.

*Example 5*

A starting mixture was made up by using the same grades of polymerizable materials in the same quantities as in Example 2 and using the same quantity of the same diluent.

The polymerization was conducted as in Example 1 except that 20 gm. of aluminum chloride was used, the reaction temperature was controlled within the range of 20° C. to 30° C. and the reaction period was extended for 6 hours after the addition of catalyst had been completed. No insoluble resin was formed. The recovery procedure was identical with that of Example 1.

The resin recovered by distillation was a thermoplastic soluble resin in a yield of 180 gm. (87%) which had a softening point of 118° C. (ball and ring) and a color 4 on the Gardner color scale. When dissolved in an equal weight of mineral spirits the resin showed no cloud down to a temperature of 0° C.

*Example 6*

A reaction mixture was made up comprising vinyl cyclohexene, beta-pinene and "rearranged alpha-pinene" of the same grades as in the preceding examples. The starting mixture comprised the same quantities of the several polymerizable substances and diluent as in Example 3.

The polymerization was conducted as in Example 1, except that 24 gm. of aluminum chloride was used, the reaction temperature was controlled within the range of 20° C. to 30° C. and the reaction period was extended for 6 hours after the addition of catalyst had been completed. No insoluble resin was formed. The recovery procedure was identical with that of Example 1.

The resin recovered by distillation was a thermoplastic soluble resin in a yield of 252 gm. (86%) having a softening point of 134° C. (ball and ring) and a color 4 on the Gardner color scale. When dissolved in an equal weight of mineral spirits the resin showed no cloud down to a temperature of 0° C.

*Example 7*

In this example a starting mixture was made up by using the same grades of polymerizable materials in the same quantities as in Example 4, and using the same quantity of the same diluent.

The polymerization was conducted as in Example 1, except that 28 gm. of aluminum chloride was used. The reaction temperature was controlled within the range of 20° C. to 30° C. and the reaction period was extended for 6 hours after the addition of catalyst had been completed. No insoluble resin was formed. The recovery procedure was identical with that of Example 1.

The resin recovered by distillation was a thermoplastic soluble resin in a yield of 290 gm. (89%) which had a softening point of 140° C. (ball and ring) and a color 4 on the Gardner scale. When dissolved in an equal weight of mineral spirits the resin showed no cloud down to a temperature of 0° C.

The foregoing Examples 5, 6 and 7 illustrate the fact that with lower reaction temperature it is desirable to use an increased quantity of catalyst and to continue the polymerization period for an extended length of time in order to secure results close to those obtained at higher temperature. As noted above the vinyl cyclohexene is relatively sluggish in its response to polymerization promoting stimuli. It will be noted that in Examples 5, 6 and 7 in which respectively the proportioning of vinyl cyclohexene and the terpene blend is identical with that of Examples 2, 3 and 4 the lower temperature of polymerization gives a resin of somewhat higher softening point, obtained in slightly decreased yield. At the expense of an even more extended reaction period the polymerization at the lower temperature gives an almost equal yield of resin as compared with the higher temperature, while obtaining the benefit of higher softening point.

Using the same proportions of vinyl cyclohexene and the terpene blend as in Examples 2, 3 and 4 polymerization was conducted at a temperature within the range of 10° C. to 15° C. In each instance catalyst in a quantity equal to 14% the weight of the combined vinyl cyclohexene and the terpene blend was used and the polymerization period after addition of the catalyst was extended to 12 hours. The result was to obtain yields approximately identical with those of Examples 5, 6 and 7 with an increase of about 4° C. in the softening point of the resin.

Duplication of the procedures given above but using aluminum bromide instead of aluminum chloride as catalyst gave almost identical results.

In all the foregoing examples the beta-pinene is a commercial, 85% pure, terpene which was not subjected to special purifying treatment. By using a beta-pinene which had been brought to over 95% purity, I obtain a yield which in each instance is slightly greater and a softening point which is slightly higher.

The resin produced from a starting material composed of vinyl cyclohexene and a "rearranged alpha-pinene"-beta-pinene blend corresponds in most particulars to terpene resins. In all proportioning of the two ingredients of the starting material the resin is usable in all ways in which a straight terpene resin is usable, as for example in coating compositions, hot melt coatings. adhesives, rubber compounding, chewing gum bases and the like. Guides to satisfactory procedure in such uses are found in patents to Frank W. Corkery and Samuel G. Burroughs No. 2,320,717; No. 2,319,389; No. 2,320,716; No. 2,320,718; and No. 2,357,811.

For some uses the resin of this invention is more advantageous than beta-pinene resin and the other terpene resins, because of its somewhat higher softening point. Although terpene resins as carefully produced are considered to possess good color stability, the resin produced by polymerizing a mixture of vinyl cyclohexene and the defined terpene blend exhibits higher resistance to color development than do the other terpene resins, including straight beta-pinene resin.

It has been noted above that it is desirable in the process to use an inert solvent diluent of low aniline point. I have found it preferable to use such solvent diluents as have an A. S. T. M. D 611–46 T aniline point no higher than 35° C. Most of the commercially desirable solvents of this sort have aniline points by the above determination falling within the range of about 15° C. to 35° C.

Throughout the specification "aniline point," where not specifically qualified by the method of its determination, is to be understood as determined by the A. S. T. M. D 611–46 T aniline point method. Where not specifically qualified in the specification, "softening point" is to be understood as determined by the ball and ring method of softening point determination. Where not specifically qualified in the specification, distillation temperatures are to be understood as taken at 750 mm. of mercury. Where not specifically qualified proportions are to be understood as proportions by weight. In any example in which there is no notation as to the formation of insoluble resin, no insoluble resin was formed.

In my companion application Serial No. 45,783, filed Aug. 23, 1948 of even date herewith, I have disclosed the polymerization of mixtures of turpentines which contain beta-pinene and alpha-pinene with the defined cyclic mono-olefine in which a vinyl group has been substituted. In my companion applications Serial No. 45,786, and Serial No. 45,784, the polymerization of the vinyl cyclohexene with beta-pinene and alpha-pinene as separated terpenes is respectively disclosed, and in my companion application Serial No. 45,785, the polymerization of the vinyl cyclohexene with camphene alone is disclosed. Herein the disclosure relates to the polymerization of "rearranged alpha-pinene" defined herein as comprising more than 70% of a mixture of camphene and dl-limonene, together with beta-pinene, with the defined cyclic mono-olefine, 1-vinyl cyclohexene-3, designated throughout the specification simply as vinyl cyclohexene, and to the resins produced by that polymerization.

I claim as my invention:

1. The method of producing hard resin polymers by bringing a mixture of 1-vinyl cyclohexene-3 (cyclic dimer of butadiene) and a terpene blend consisting of beta-pinene and "rearranged alpha-pinene" composed over 70% of camphene and dl-limonene, the said blend comprising from 40% to 80% beta-pinene, in a proportion of vinyl cyclohexene equal to from 10% to 50% the weight of the mixture into reactive contact with an acid-reacting metal halide polymerization catalyst selected from the group consisting of aluminum chloride and aluminum bromide in the presence of an inert solvent diluent for the polymers of the vinyl cyclohexene and the said terpene blend, to form hard resin polymers of vinyl cyclohexene and the terpene blend in solution, and recovering the resin polymers so formed.

2. The method of producing hard resin polymers by bringing a mixture of 1-vinyl cyclohexene-3 (cyclic dimer of butadiene) and a terpene blend consisting of beta-pinene and "rearranged alpha-pinene" composed over 70% of camphene dl-limonene, the said blend comprising from 40% to 80% beta-pinene, in a proportion of vinyl cyclohexene equal to from 25% to 45% the weight of the mixture into reactive contact with an acid-reacting metal halide polymerization catalyst selected from the group consisting of aluminum chloride and aluminum bromide in the presence of an inert solvent diluent for the polymers of the said vinyl cyclohexene and the said terpene blend, to form hard resin polymers of vinyl cyclohexene and the terpene blend in solution, and recovering the resin polymers so formed.

3. The method of producing hard resin polymers by bringing a mixture of 1-vinyl cyclohexene-3 (cyclic dimer of butadiene) and a terpene blend consisting of beta-pinene and "rearranged alpha-pinene" composed over 70% of camphene and dl-limonene, the said blend comprising from 40% to 80% beta-pinene, in a proportion of vinyl cyclohexene equal to from 10% to 50% the weight of the mixture into reactive contact with aluminum chloride polymerization catalyst in the presence of an inert solvent diluent for the polymers of the said vinyl cyclohexene and the said terpene blend, to form hard resin polymers of vinyl cyclohexene and the terpene blend in solution, and recovering the resin polymers so formed.

4. The method of producing hard resin polymers by bringing a mixture of 1-vinyl cyclohexene-3 (cyclic dimer of butadiene) and a terpene blend consisting of beta-pinene and "rearranged alpha-pinene" composed over 70% of camphene and dl-limonene, the said blend comprising from 40% to 80% beta-pinene, in a proportion of vinyl cyclohexene equal to from 10% to 50% the weight of the mixture into reactive contact with aluminum bromide polymerization catalyst in the presence of an inert solvent diluent for the polymers of the said vinyl cyclohexene and the said terpene blend to form hard resin polymers of vinyl cyclohexene and the terpene blend in solution, and recovering the resin polymers so formed.

5. The method of producign hard resin polymers by bringing a mixture of 1-vinyl cyclohexene-3 (cyclic dimer of butadiene) and a terpene blend consisting of beta-pinene and "rearranged alpha-pinene" composed over 70% of camphene and dl-limonene, the said blend comprising from 40% to 80% beta-pinene, in a proportion of vinyl cyclohexene equal to from 25% to 45% the weight of the mixture into reactive contact with the aluminum chloride polymerization catalyst in the presence of an inert solvent diluent for the polymers of the said vinyl cyclohexene and the said terpene blend to form hard resin polymers of vinyl cyclohexene and the terpene blend in solution, and recovering the resin polymers so formed.

6. The method of producing hard resin polymers by bringing a mixture of 1-vinyl cyclohexene-3 (cyclic dimer of butadiene) and a terpene blend consisting of beta-pinene and "rearranged alpha-pinene" composed over 70% of camphene and dl-limonene, the said blend comprising from 40% to 80% beta-pinene, in a proportion of vinyl cyclohexene equal to from 25% to 45% the weight of the mixture into reactive contact with aluminum bromide polymerization catalyst in the presence of an inert solvent diluent for the polymers of the said vinyl cyclohexene and the said terpene blend to form hard resin polymers of vinyl cyclohexene and the terpene blend in solution, and recovering the resin polymers so formed.

7. The resin produced by the process of claim 1.

SAMUEL G. BURROUGHS.

REFERENCES CITED

The following references are of record in the file of this patent:

UNITED STATES PATENTS

| Number | Name | Date |
| --- | --- | --- |
| 2,346,791 | Rummelsburg | Apr. 18, 1944 |
| 2,349,210 | Traylor | May 16, 1944 |
| 2,383,084 | Rummelsburg | Aug. 21, 1945 |
| 2,401,414 | Doumani | June 4, 1946 |
| 2,475,234 | Gleason et al. | July 5, 1949 |
| 2,487,898 | Rummelsburg | Nov. 15, 1949 |

FOREIGN PATENTS

| Number | Country | Date |
| --- | --- | --- |
| 614,781 | Great Britain | Dec. 22, 1948 |

OTHER REFERENCES

Laitinen et al., Ind. and Engr., Analytic Ed., vol. 17, pp. 769–772 (1945).